Sept. 24, 1968     H. H. HATCH     3,402,464
METHOD OF MAKING A POTENTIOMETER
Filed July 14, 1966     2 Sheets-Sheet 1
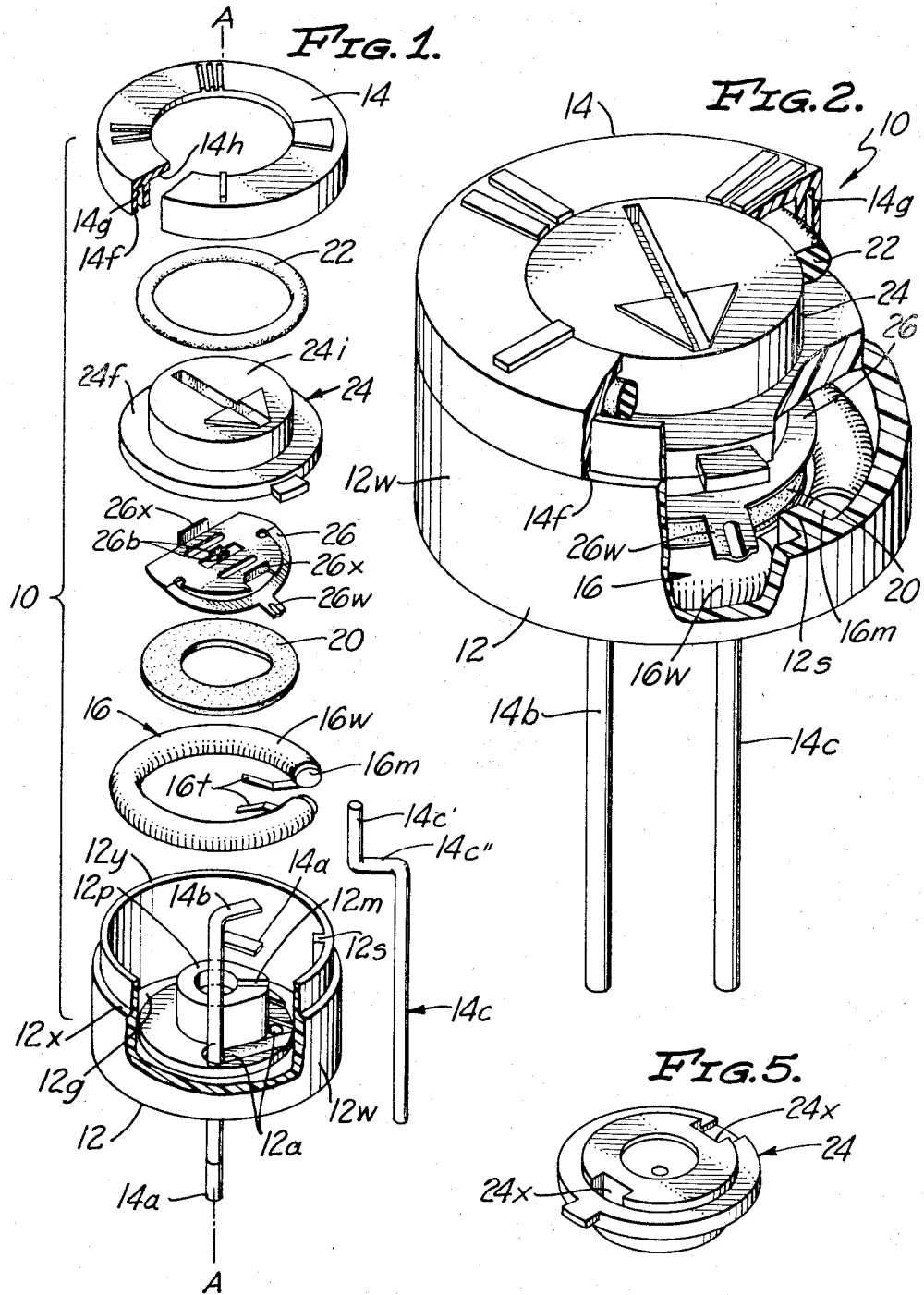
INVENTOR
HOWARD H. HATCH Sept. 24, 1968   H. H. HATCH   3,402,464
METHOD OF MAKING A POTENTIOMETER
Filed July 14, 1966   2 Sheets-Sheet 2
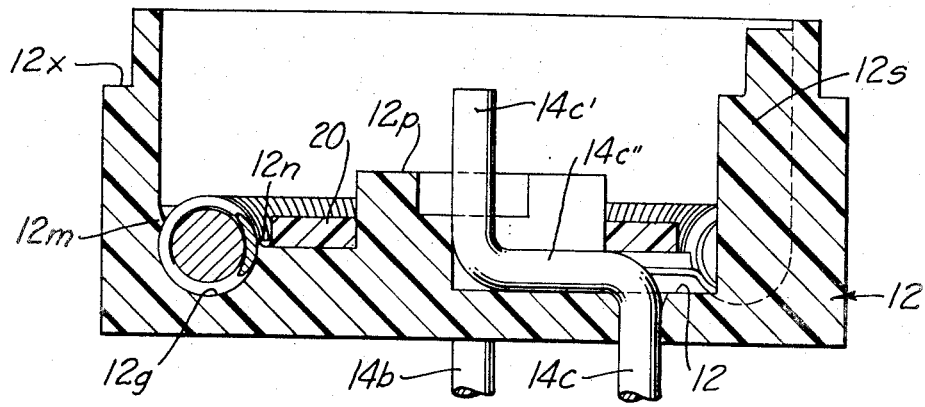
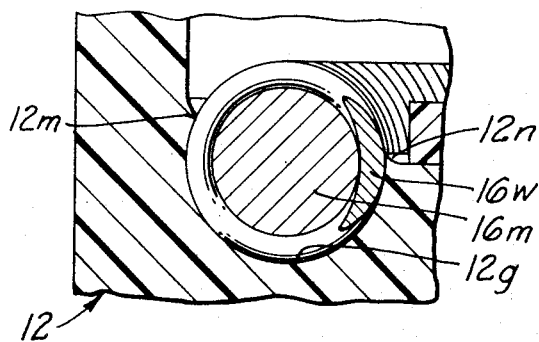
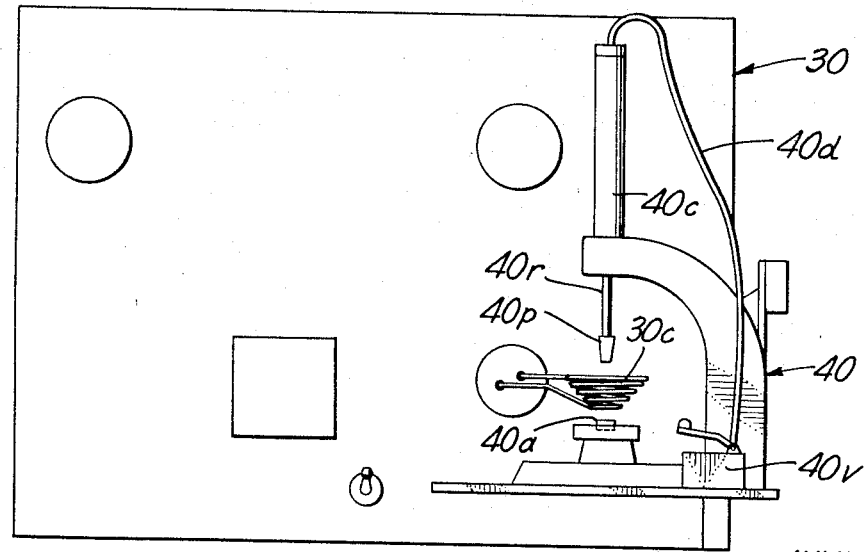
INVENTOR
HOWARD H. HATCH
BY United States Patent Office 3,402,464
Patented Sept. 24, 1968

3,402,464
METHOD OF MAKING A POTENTIOMETER
Howard H. Hatch, Riverside, Calif., assignor to
Bourns Inc., a corporation of California
Filed July 14, 1966, Ser. No. 565,156
2 Claims. (Cl. 29—610)

ABSTRACT OF THE DISCLOSURE

The invention herein disclosed relates to a novel construction in potentiometers having metal-core elements or wire-wound elements, and to a method of producing the same, wherein the resistance element comprising metal element-core or a resistive wire and a core or mandrel on which the wire is wound, is precisely affixed in accurately-determined position to a part or parts of the potentiometer such as a part or parts forming the base portion of the housing, by first disposing the resistance element in contact with the part or parts, heating the element as by inductive heating to a temperature sufficient to permit it to plastically deform the part or parts when pressure is applied, and pressing the hot element into the part or parts by controlled press means which force the element into the plastic material and bring the active or contact-brushing zone or surface of the element into a plane and into accurately determined position relative to a reference surface of the part or parts. During the pressing operation the wire-wound element becomes embedded in the material, which is thermoplastic, and is very firmly bonded thereto upon solidification of the thermoplastic material. As will be made evident, an entire base member, for example, may be formed of thermoplastic material for use in the process; or only a part or portion of such base member or structure may be thermoplastic. The thermoplastic material will, in either case, be deformed and serve to integrate the resistive element with the base or the like.

As will be understood by those skilled in the art and versed in the prior-art practice of mounting conventional wire-wound resistance elements and the like in potentiometer bases with adhesive, the present invention eliminates all of the difficulties caused by nonuniformity of thickness of resistance elements which become evident at the wiper-contacted surface of the element when the opposite surface is seated upon adhesive or adhesively united to a base. In the practice of the present invention a precision-faced press member is made to press againt the wiper-contacted or "active" surface of the element and force various portions of the element into the thermoplas.ic portion of the potentiometer body respective distances which may be different according to the respective thicknesses of the portions, whereby the brushed or active surface of the element is precisely positioned in a plane at a determined distance from a reference surface such as the bottom of the body, or a cover-positioning surface provided by a ledge. Thus the active or contact engaged surfaces of all of a group of potentiometers are accurately positioned relative to a reference surface, whereby contact pressures and like critical factors of potentiometer operation can be brought to a high degree of uniformity among the potentiometers of a group thereof. As will be evident to those skilled in the art, such uniformity is of great value, especially in very small potentiometers of the so-called miniature and subminiature classes. Corollary advantages of the procedure according to the invention are that the procedure can be very much more rapidly executed than can cementing of elements to bases or covers, uniformity of product is greatly improved, and tedious hand-operations are eliminated since the devices used are admirably adapted to automatic operations. As is evident, the article produced is not only much less expensive but also much more satisfactory than the prior-art cemented-in-place metalcore resistance element potentiometer structure.

As is made obvious by the preceding brief description of the invention, it is a principal object of the invention to provide general improvements in potentiometers having resistance elements comprising a metal wire, and methods of making the same.

Another object of the invention is to provide an improved potentiometer, in which a metal-containing resistance element is embedded in a thermoplastic portion of the potentiometer structure and is thereby affixed permanently in position.

Another object of the invention is to provide an improved method for securing a wire-containing resistance element in place in the structure of a variable resistor or potentiometer.

Other objec.s and advantages of the present invention are hereinafter set forth or made evident in the appended claims and the following description of a preferred mode and potentiometer structure. A preferred means utilized in the improved method, and a presently preferred form of s ructure, are illustrated in exemplary form in the accompanying drawings forming a part of this specification. In the drawings:

FIGURE 1 is an exploded pictorial view of components of the noted presently preferred exemplary form of potentiometer in which the invention is embodied and practiced, with some portions broken away to better show details, the components being shown as they are prior to assembly;

FIGURE 2 is a fragmentary pictorial view of the potentiometer illustrated in FIGURE 1, with the components assembled but portions of some thereof broken away to illustrate details;

FIGURE 3 is a sectional view of the base portion of the potentiometer depicted in FIGURE 1, illustrating the assembled disposition of certain ones of the potentiometer components;

FIGURE 4 is a fragmentary sectional view, grossly enlarged, illustrating some features of the invention;

FIGURE 5 is a view of a rotor comprised in the structure shown in FIGURE 2, in inverted attitude; and FIGURE 6 is a partly schematic diagram illustrating features of the method and of apparatus employed in the method of the invention.

In the drawings illustrating the potentiometer the scale is grossly enlarged, typical presently manufactured potentiometers according to the invention being of such dimensions as one-half inch diameter and three-sixteenths inch diameter.

The invention is herein illustrated and described in exemplary form as practiced in connection with a very small potentiometer of the class known in the art as single-turn rotary adjustment potentiometers. Such an exemplary potentiometer 10 (FIGURE 2) comprises a body or base 12 of a generally circular plan form and a lid or cap 14, which together form a housing or case in which operating and electrical components of the instrument are housed. Base 12 (FIGURE 1) is initially produced by molding; and preferably is of thermoplastic material, for example, nylon. The base is produced with three apertures, such as 12a, through the floor thereof, for the accommodation of terminal connections or pins presently to be described. Also, an outer annular groove 12g is provided just inside the outer wall 12w, the groove being interrupted by an inwardly extending enlargement or thickening of the wall which provides a stationary stop 12s. Further, the base is provided with a centrally disposed pedestal 12p which is provided with a radially-extending slot 12m communicating with the aperture 12a next adjacent stop 12s.

Headed terminal pins such as 14a, 14b and 14c have their wire-like shanks pressed through respective ones of apertures 12a and their heads disposed in respective shallow depressions and slot 12m provided in the floor of the base. An arcuate resistance element 16 comprising an insulated-wire core or mandrel 16m carrying a resistive material here illustrated as a winding of resistance wire 16w and bearing strip-like terminal tabs 16t spot-welded thereto at respective electrical ends of the element is disposed initially in groove 12g of the base. Following seating of the element 16 on the floor of the groove 12g, terminal tabs 16t are spot-welded to respective ones of the underlying heads of the terminal pins 14a and 14b. As thus disposed, the element is subject to displacement, despite being secured, by way of tabs 16t, to the terminal pins; and further there is no assurance that the upper exposed surface of the element is either planar, or if planar, is in a plane perpendicular to the axis A—A (FIGURE 1) of the potentiometer. The latter condition is a requisite to acceptable operation of the wiper mechanism of a miniature rotary adjustment potentiometer. Further, as thus disposed in the annnular groove 12g in the body, the upper exposed or active surface of the resistance element that is brushed by the wiper or movable contact, may or may not be disposed in a plane perpendicular to the axis A—A and at a determined distance from the appropriate cap-locating reference surface of body 12. As is known, irregularities in diametral dimensions of mandrel 16m and of wire 16w may easily result in the wiper-engaged active upper surface of the element being undulatory in character, whereby contact pressure exerted thereon by a wiper or contact presently to be described is nonuniform from point to point along the element. As is well understood in the art, uniformity of contact pressure, both within an individual potentiometer and from potentiometer to potentiometer among like instruments, is extremely desirable. Neither by cementing nor by mechanical clamping of the element in place is either of the above-noted desirable characteristics attained.

In accord with the invention, the upper active surface of the resistance element 16 is positively and with great certainty brought into a plane perpendicular to the axis of the instrument and spaced a uniform and precisely determined distance below the cap-locating reference surface here provided by an annular ledge or shelf 12x formed around the body, and there permanently affixed in that disposition. Further, the positive disposition of the active surface of the element as noted is accomplished with great havings in time and equipment over that required when an element is adhesively mounted in a potentiometer. As is known in the art, when an element is adhesively affixed in place in a small potentiometer body, a very small amount of adhesive must be very carefully applied to the base or element (whereby no excess or other bit of adhesive will cover a portion of the active surface of the element), the element must be meticulously placed in position, and the element must be held in place while the adhesive is cured as in an oven. According to the present invention, the aforementioned positioning and welding steps may be performed with celerity and without exercise of more than nominal parts-handling care. Thereafter the base is slipped into place in a recess in a confining anvil that is encircled by the coil of an induction-heating apparatus, the latter is energized and an accurately formed pressing die is lowered and forced downwardly toward the anvil to bring a first annular surface on the die into contact with the active surface of the element. While force is thus being applied to the element the latter is very rapidly inductively heated to a temperature at which the thermoplastic material at the bottom of groove 12g of body 12 is made plastic, following which the die forces the element into the thermoplastic material or part of the body, concurrently bringing all points of the active or wiper-engaged surface of the element into planar relation. Further, the element is forced downwardly into the thermoplastic material until a second annular surface on the pressing die halts further die movement by coming to rest on the annular reference surface provided by ledge 12x. Thus the active or wiper-brushed surface of the element is precisely positioned relative to the reference surface, whereby, as will later be made evident, wiper contact pressure will be uniform and will not measurably vary from instrument to instrument.

The heating by induction is initiated preferably by cyclically operating means and is adjustable as to duration and intensity by adjusting devices common to commercially available induction heating apparatus; and the heating is adjusted to be rapid and of short duration. The pressing die is momentarily maintained in position following termination of downward movement and cessation of heating, whereby the plastic body material cools and becomes rigid while the element is maintained precisely positioned. During the short time of limited plastic deformation of the thermoplastic material adjacent the groove 12g of body 12 and immediately adjacent the bottom and sides of element 16, the plastic material flows or is forced up and partly above the element as at 12m and 12n, and into the interstices or spaces between turns of wire 16w in event the element is wirewound. In the case of a coated-wire element, the thermoplastic material flows around and over the lower exposed portion of the element. Thus not only is effected embedment and locking engagement of the lower and outer portions of the element convolutions of wire 16w in and by the thermoplastic material in a wire-wound element, but further a slight overlaying of the inner and outer portions of the periphery of the element occurs. The element is thus so securely locked in precisely the desired position in the body that only forceful disintegration of the body will serve to separate the two components.

The exemplary illustrated potentiometer further includes an insulator 20, initially and as shown in FIGURE 1, in the form of a shaped washer-like perforate disc of thermoplastic material such as nylon. The insulator is applied over the exposed tabs 16t of element 16, and around post or pedestal 12p, and is ultrasonically bonded to the base and the exposed portions of the terminal pin tabs, by an ultrasonically vibrated die that is brought to bear on the insulator. Thus a base assembly is completed and is ready for optical and electrical inspection and testing.

The exemplary potentiometer includes a cover and contact assembly that comprises cap 14, an O-ring seal 22, and a rotor structure comprising an insulative rotor block 24 carrying a conductive contact device 26 which has a resilient wiper 26w integral therewith. The contact device is secured to rotor block 24 as by clamping wings 26x, 26x, which engage in complementary depressions 24x, 24x (FIGURE 5) in the lower face of rotor 24; and/or as by adhesive means. As shown in FIGURE 2, the contact device is provided adjacent its center with a pair of integral resilient elongate brushes 26b which clasp and brush on the upper end 14c' of terminal pin 14c when the rotor and cap assembly is pressed into place on the base assembly; it being understood that the offset 14c'' of pin 14c reposes at the bottom of slot 12m in the base and that the end 14c' is thus positioned along the axis A—A of the potentiometer. During the operation of assembling the cap assembly to the base assembly, an annular groove 14g provided in the lower face of cap 14 receives the annular lip 12y of base 12 and the reference surface 14f is brought to rest against the annular reference surface 12x of base 12, the upper central portion 24i of rotor block 24 protruding through the central aperture of cap 14 with the flange 24f thereof overlaid by the flange 14h of cap 14, and the rotor block providing means for rotating the contact device to move contact or wiper 26w along the active exposed upper surface of resistance element 16.

During assembly of the potentiometer the surfaces 14f on cap 14 and 12x on base 12 are brought into contact by application of pressure, and ultrasonic stresses are induced within groove 14g by an ultrasonically vibrated die applied to cap 14, whereupon a portion of the base at surface 12y is melted and fused with contacting material of the cap, uniting the base and cap into an integral unit. For ease in accurately rotating the rotor block 24, a screwdriver slot as shown, or like tool-receiving formation, is provided in the crown portion of the rotor block.

The base assembly, with the three terminal pins 14a, 14b and 14c firmly affixed and sealed therein by the fused insulator 20, is thus provided with mounting pins for insertion through a circuit board and for electrical connections to the potentiometer.

In certain instances, as, for example when the potentiometer is formed of ceramic or other nonplastic material, the invention is equally well practiced by utilizing a thermoplastic insert in the bottom of groove 12g, which insert may be in the form of a flat ring and which is softened and plastically deformed by the heat and pressure applied via the inductively heated element and which serves to firmly bond together the base and the element.

In FIGURE 6 there is somewhat diagrammatically shown a commercial high frequency induction heating apparatus 30 comprising conventional controls and a fluid-cooled coil 30c, associated with a pneumatic press 40 having an anvil die 40a specially shaped to receive a base 12 and having a pressing die 40p shaped to press an element into the base within the heating zone of coil 30c. The pressing die 40p is secured to a piston rod 40r that is attached to a piston head reciprocable in a cylinder 40c. The piston is operated by internal spring means and by air supplied via a conduit 40d and a control valve 40v. The illustrated means for performing the steps of the method of the invention are manually controlled, the means for performing the steps automatically being not of the present invention.

Employment of thermoplastic material for securing the element in place rather than use of adhesive, produces a much superior attachment of the element to the body and eliminates the tedious and painstaking application of adhesive, all of which improvements are inherent; but far more importantly it permits extremely accurate and planar placement of the upper wiper-engaged surface of the element with concurrent permanent anchoring of the active surface of the element in a plane and in place, all in a series of easily-automated and rapidly accomplished steps.

The foregoing detailed disclosure shows attainment of the mentioned objects of the invention. In the light of the disclosure changes within the true spirit and scope of the invention will occur to others; and accordingly it is not desired that the invention be restricted to details other than is required by the appended claims.

I claim:
1. In a method of making a potentiometer, the steps comprising:
   providing a resistance element having a wire-like component, and a base structure comprising a thermoplastic material;
   disposing the resistance element in contact with the thermoplastic material;
   inductively generating electric eddy current in the wire-like component of the resistance element to heat the latter to a temperature above the softening temperature of the thermoplastic material; and
   pressing the resistance element at least partially into the thermoplastic material to embed the element therein and firmly affix the element to said base structure.

2. A method according to claim 1, including the steps of providing a reference surface on said base structure, and pressing the resistance element into said thermoplastic material to bring an active surface thereof into a plane a precisely determined distance from said reference surface.

References Cited
UNITED STATES PATENTS

| | | | |
|---|---|---|---|
| 492,757 | 2/1893 | Carpenter | 338—253 |
| 2,477,121 | 7/1949 | Ganci | 338—253 |
| 2,873,509 | 2/1959 | Sorber | 29—610 |
| 2,880,296 | 3/1959 | Berkelhamer | 29—610 X |
| 2,948,051 | 8/1960 | Eisler. | |

JOHN F. CAMPBELL, *Primary Examiner.*

J. L. CLINE, *Assistant Examiner.*